Dec. 21, 1965    T. L. ATKINSON    3,224,636
LAWN SPREADER

Filed Dec. 14, 1964    2 Sheets-Sheet 1

INVENTOR.
TRUMAN L. ATKINSON
BY
ATTORNEYS

Dec. 21, 1965    T. L. ATKINSON    3,224,636
LAWN SPREADER

Filed Dec. 14, 1964                2 Sheets-Sheet 2

INVENTOR.
TRUMAN L. ATKINSON
BY
ATTORNEYS

United States Patent Office 3,224,636
Patented Dec. 21, 1965

3,224,636
LAWN SPREADER
Truman L. Atkinson, 609 Lake Shore Drive,
Ludington, Mich.
Filed Dec. 14, 1964, Ser. No. 418,092
7 Claims. (Cl. 222—41)

This invention relates to lawn spreaders. More particularly, this invention relates to an improved lawn spreader of a construction such that one is able to clean the spreader much more conveniently.

This application is a continuation-in-part of my co-pending application Serial No. 304,426, filed August 26, 1963 and entitled Lawn Spreader. As was disclosed in that application, many types of lawn spreaders are presently in existence, these spreaders utilized to distribute materials such as fertilizer, weed killer or seed over the ground. One problem which has been encountered in such lawn spreaders is that the material, for example fertilizer, collects in the area between the gate and the bottom of the spreader hopper. Gates on such spreaders operate to progressively open and close apertures to regulate the quantity of material distributed. If the material collects in this area, the apertures may become plugged and the operation of the gate sluggish and inaccurate. Therefore, it is mandatory that this area be kept clean. Patent No. 3,122,273 disclosed a structure which eliminated the necessity to remove screws and disassemble the structure to gain access to the area which needs cleaning. To disassemble prior structures, the use of tools was required and considerable time was consumed. Usually, the user of the lawn spreader neglected to perform the proper and necessary cleaning operations. Materials built up and as a result the spreader would fail to operate properly and evenly and would not distribute the proper quantity of material. Enough material would collect after a period of time so that the gate itself would buckle, resulting in permanent damage to the spreader.

The present invention is an improvement of the structure shown in my co-pending application. In the present application, a specific type of bracket means is provided which uniquely guides a gate to progressively open and close apertures to regulate the quantity of material distributed, the bracket means also being adapted to receive and hold the gate in spaced relationship from the bottom of a hopper for cleaning. Additionally, structure is provided to better facilitate the movement of the gate relative to the bracket means. It is therefore an object of this invention to provide a lawn spreader which has an improved means of attaching a gate to a hopper facilitating easy removal and cleaning of the apparatus.

A further object of this invention in the provision of such a lawn spreader achieving the above results, yet maintaining a simplicity of structure allowing ease of operation, inexpensiveness in fabrication and durability in performance.

These and other objects of this invention will become apparent to those skilled in the relevant arts upon reading the following specification in conjunction with the accompanying drawings, wherein.

Briefly, this invention relates to a lawn spreader of the type having a hopper adapted to receive material to be spread, an axle journaled adjacent the bottom of the hopper and having wheel means for transporting the hopper. Handle means is fixed to the hopper for moving it, apertures being formed in the bottom of the hopper for discharging material. A gate having a shutter plate conforming to the bottom of the hopper is provided to cover the apertures, members being affixed to the ends of the gate and each having a slot therein receiving the axle adjacent its ends. A unique bracket means is provided to hold the gate against the bottom of the hopper. The bracket means includes a first portion lying adjacent the bottom of the hopper, the shutter plate slidable between the first portion and said bottom. The bracket means also includes a second portion spaced a greater distance from the bottom. A control means is associated with the gate for moving the gate and the shutter plate to progressively uncover the apertures and regulate discharge of material therefrom, the gate movable through the control means to a point where the shutter plate is released from the first portion of the bracket means and the gate drops into the second portion of the bracket means spaced from the bottom of the hopper as the axle moves in the slots. In a more limited aspect of the invention, a unique track is provided for the control means to better facilitate its cooperation with the bracket means described.

Figure 1:
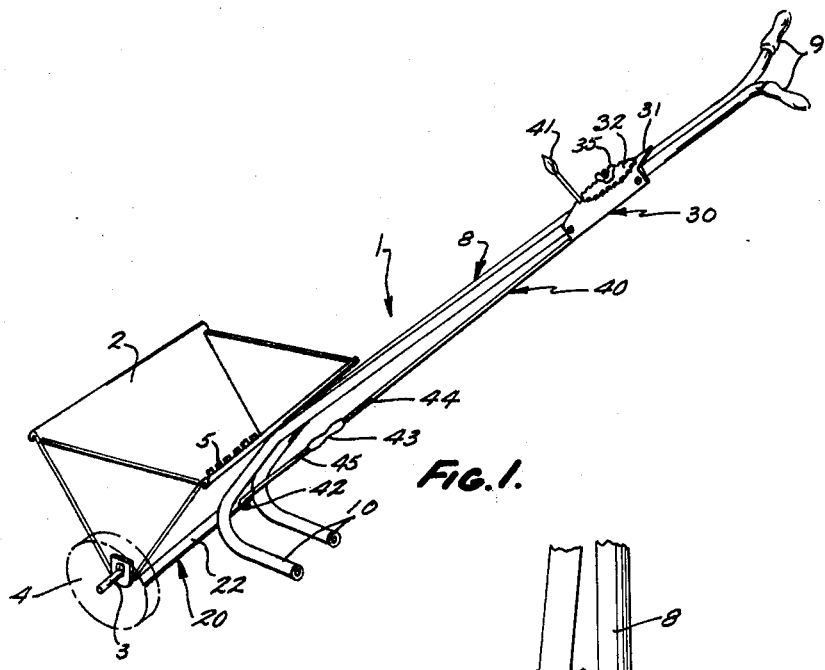
FIG. 1 is a perspective view of an embodiment of the lawn spreader of this invention.
Figure 6:
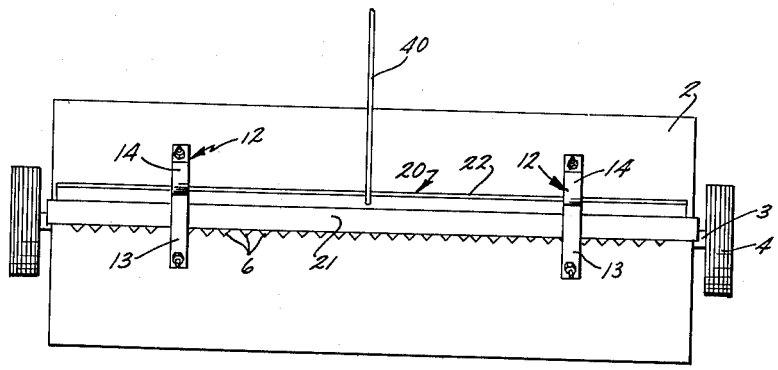
FIG. 6 is a bottom view thereof.

Referring more specifically to the drawing, the reference numeral 1 designates an embodiment of a lawn spreader made in accordance with the teachings of this invention (FIG. 1). The spreader 1 includes a hopper 2, a handle 8, a bracket means 12, a gate 20 and a control means 30 (FIGS. 1 and 6). The hopper 2 is shaped to a configuration directing materials placed therein to the bottom thereof. An axle 3 extends rotatably through the lower portion of each side wall of the hopper 2 in a conventional manner. A wheel 4 is affixed to each end of the axle 3 to permit movement of the hopper along the ground. An agitating mechanism 5 is associated with the axle 3 within the hopper 2, forcing materials from the bottom thereof through the apertures 6 formed along the bottom of the hopper 2. The handle 8 is affixed to the back of the hopper 2, the handle 8 including handle bars 9 for pushing the spreader along the ground, and feet 10 for facilitating the freestanding of the spreader.

Figure 5:
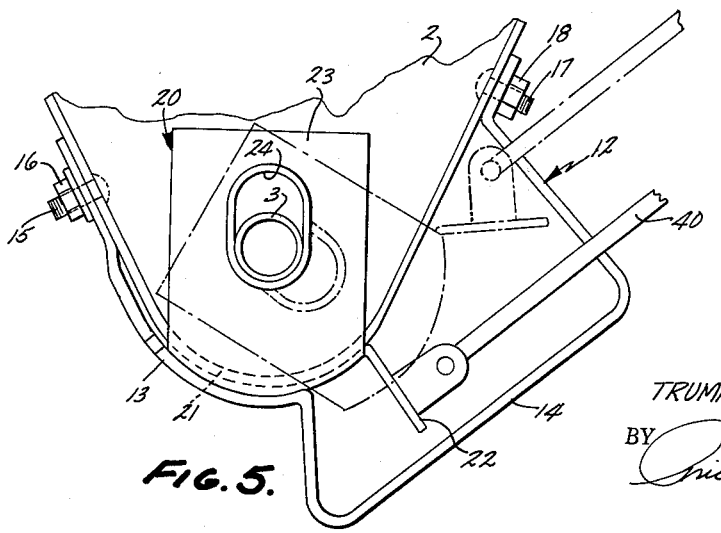
FIG. 5 is an enlarged, side view of the lower portion of the lawn spreader, the gate also shown in dotted lines to show its cooperation with the bracket means of this invention.

The bracket means 12 is secured to the bottom of the hopper 2 (FIGS. 5 and 6). In the embodiment shown, the bracket means 12 includes a pair of elongated brackets, the first portions 13 thereof spaced slightly from the bottom of the hopper to slidably accommodate the gate 20 which will be more fully described hereinafter. Each bracket also includes a second portion 14 which comprises a loop. It will be noted that the loops 14 are of a size such that the gate 20 may be slidably accommodated therein when disengaged from the first portions 13. The importance of this structure will be more fully described hereinafter. Bolts 15 extend through the lower portion of the front of the hopper 2, the bolts extending through the ends of the brackets adjacent the first portions 13 thereof. Nuts 16 hold the brackets in position and it will be noted that the elongated brackets lie between pairs of apertures 6 so that flow of material therethrough is not hindered. Bolts 17 extend through the upper portion of the back of the hopper 2, the bolts extending through the other ends of the brackets adjacent the second portions 14 thereof. Nuts 18 secure these ends of the brackets in position.

Figure 4:
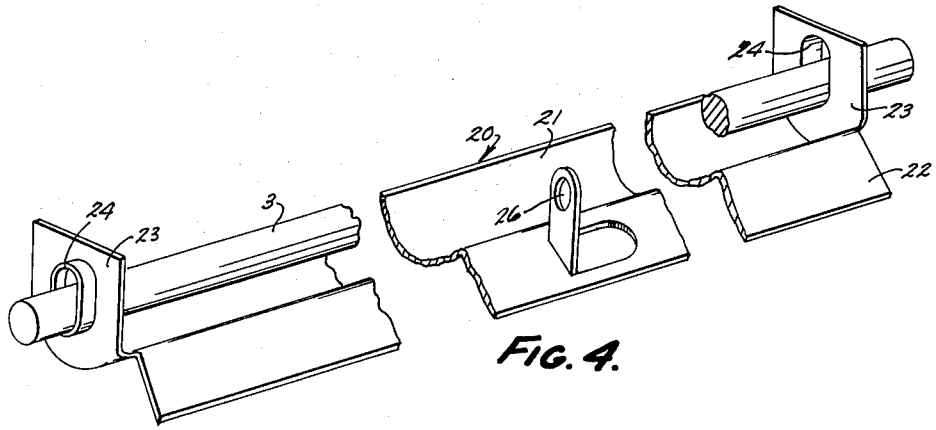
FIG. 4 is a perspective view of the gate utilized in this lawn spreader.

The gate 20 (FIGS. 4–6) includes a shutter plate 21 shaped to conform with the bottom of the hopper 2. A flange 22 depends from the edge of the shutter plate 21. A member 23 extends upwardly from each end of the shutter plate 21, each member including a closed slot 24, the slots being of such a size that they accommodate the axle 3 as shown. An opening 26 is provided at generally the middle of the flange 22. It will now be seen that the shutter plate 21 of the gate 20 is positioned against the bottom of the hopper 2 for covering of the apertures 6 therein. The shutter plate 21 is held snugly against the bottom of the hopper 2 by means of the first portions 13 of the brackets 12, the first portions 13 being of a width such that they lie between a pair of apertures 6. The slots 24 in the members 23 at the ends of the gate 20 receive the axle 3 in the area between the hopper 2 and the wheels 4. It will further be seen that the shutter plate 21 may be slidably moved to the position shown in dotted lines in FIG. 5, resting within the loops 14 of the brackets 12, spaced from the bottom of the hopper 2.

Figure 2:
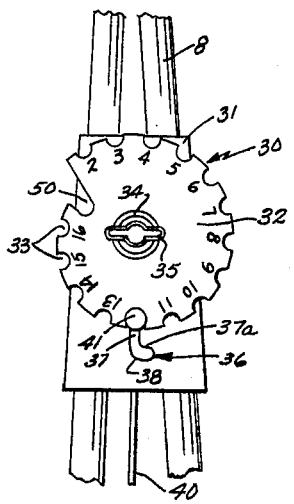
FIG. 2 is a plan view of the top of the control means of this lawn spreader.
Figure 3:
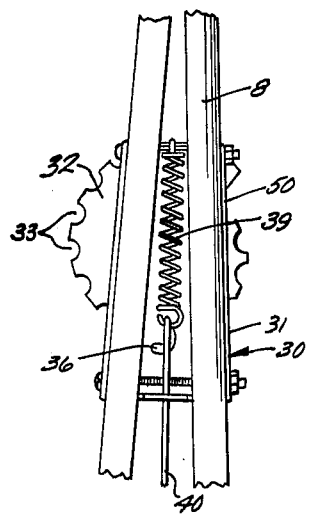
FIG. 3 is a bottom view of the control means shown in FIG. 2.

The control means 30 includes a plate 31 secured to the upper portion of the handle 10 (FIGS. 1–3). A disc 32, having a plurality of indentations of varying depth 33 formed around its circumference, is rotatably secured to the top of the plate 31 by means of a threaded bolt 34 having an enlarged head 35. When the head 35 is rotated in one direction, the disc 32 may be rotated. However, when the head 35 of bolt 34 is rotated in the other direction, the head 35 affixes the disc 32 with respect to the plate 31 of control means. A generally L-shaped track 36 is formed in the plate 31. The track 36 includes a pair of legs 37 and 37a, the track being characterized by having a rounded outer configuration 38 providing a smooth transition between the legs 37 and 37a. The importance of this structure will be explained hereinafter.

The upstanding end 41 of the control rod 40 extends through the track 36, adapted to slide therein and therealong to be positioned toward the extremities of the legs 37 and 37a thereof. As shown in FIG. 3, a spring 39 is secured to the plate 31, lying on the underside thereof and attached to the end 41 of the control rods 40. It will be noted that the spring 39 at all times biases the end 41 of the rod 40 toward the disc 32. The other end 42 of the rod 40 is hooked and secured within the hole 26 in the flange 22 of the gate 20 (FIG. 5). A turnbuckle 43 is associated with the control rod 40, the rod 40 being threaded at 44 and 45 at each side of the turnbuckle. Such structure is already known to the art, it being understood that rotation of the turnbuckle 43 either shortens or lengthens the rod 40.

ASSEMBLY AND OPERATION

The lawn spreader 1 is assembled as follows. The brackets 12 are secured to the bottom of the hopper 2 as best shown in FIGS. 5 and 6, the bolts 15 and 17 extending through the brackets, the nuts 16 and 18 holding them. The shutter plate 21 of the gate 20 is positioned against the bottom of the hopper 2, extending under the first portions 13 of the brackets 12. The closed slots 24 of the members 23 at the ends of the gate 20 receive the axle 3 adjacent its ends between the wheels 4 and the hopper 2. The end 41 of the control rod 40 extends into the track 36 of the plate 31 of the control means 30. The other end of the control rod 40 is secured to the flange 22 of the gate 20. The spring 39 biases the control rod toward the disc 32, the control rod thus exerting a constant pull on the flange 22 of the gate 20.

In operation, the turnbuckle 43 adjusts the length of the rod to correspond with the various indentation 33 in the disc 32 and the aperture 6 in the bottom of the hopper 2 as follows. The indentations 33 vary in depth as best shown in FIG. 2. When the disc 32 is rotated as described and the indentation of least depth is aligned with the leg 37 of the L-shaped track 36, the spring 37 will bias the end 41 of the control rod 40 into that indentation. The rod is then adjusted to be of a length such that a very small portion of the apertures 6 are exposed at the edge of the shutter plate 21, this being accomplished by the turnbuckle 43. If the end 41 of the control rod 40 is pulled further against the spring 39 and inserted into the leg 37a of the L-shaped track 36, the apertures are completely closed by the shutter plate 21. It will thus be noted that as the disc 32 is rotated so that the end 41 of the rod 40 is biased into indentations 33 of increasing depth, larger portions of the apertures 6 are exposed because the spring 39 draws the gate 20 and thus the chutter plate 21 to expose the apertures 6. Because of the rounded edge 38 of track 36, a downward force on the control rod automatically positions the end 41 thereof in the leg 37a. A simple sideward movement automatically moves the end 41 of the rod up into the leg 37, the rounded edge 38 of the slot cooperating with the spring 39.

One indentation designated by the reference numeral 50 is of such an increased depth that when the end 41 of the rod 40 is inserted therein, the spring 39 pulls the gate 20 so far over the apertures 6 that the shutter plate 21 becomes disengaged from the first portions 13 of the brackets 12. At this point, it will be noted that the entire gate drops into the loops 14 or second portions of the brackets 12, the axle 3 sliding in the closed slots 24 in the members 23 at the ends of the gate 20 to the extremities of the slots. In this position, the bottom of the hopper 2 including the apertures 6 may be thoroughly cleaned. Further, the gate itself including the shutter plate 21 may also be thoroughly cleaned. When thus cleaned, the gate 20 is simply pushed out of the loops 14 toward the first portions 13, for example by the foot of the user, and the end 41 of the rod 40 is moved from the indentation 50 into the leg 37a. The disc 32 is rotated to any position other than a position where the indentation can receive the end 41 of the control rod 40. The shutter plate 21 cannot then become disengaged from the first portions 13 of the brackets 12.

It will now be seen that this invention has provided an improved lawn spreader having an improved means for removing the gate from the bottom of the hopper so that the hopper and the gate may be thoroughly cleaned. This may be achieved quickly and simply, no tools of any kind being required. Further, the removal of the gate is so simple that even a child can accomplish it, and no settings or adjustments or tools are necessary to remove and replace the gate. This is achieved entirely automatically with the present invention. Movement of the end 41 of the control rod into the identation 50 automatically drops the gate into the loops 14. By merely pushing the gate with one's foot from the loops 14 toward the first portions 13 of the brackets 12, the gate is again mounted upon placement of the end 41 of the control rod into the leg 37a. Cooperation of the spring 39 with the rounded outer edge 38 of the L-shaped track 36 in combined cooperation with the bracket structure assures absolute smoothness and perfection of operation. Simplicity has been retained, even though all of these results are produced.

While only one embodiment of this invention has been shown and described, it may be possible to practice the invention through the utilization of certain other embodiments without departing from the spirit and scope thereof. Such other embodiments are to be included as part of this invention unless the following claims specifically state otherwise.

I claim:

1. A lawn spreader, comprising: a hopper adapted to receive material to be spread; an axle journaled adjacent the bottom of said hopper and having wheel means for transporting said hopper; handle means fixed to said hopper for moving said hopper; apertures formed in the bottom of said hopper for discharging material; a gate including a shutter plate conforming to the bottom of said hopper and covering said apertures; members affixed to the ends of said gate, said members each having a slot therein receiving said axle adjacent its ends; bracket means holding said gate against said bottom of said hopper; said bracket means including a first portion lying adjacent said bottom of said hopper, said shutter plate slidable between said first portion and said bottom; said bracket means including a second portion spaced a greater distance from said bottom; control means associated with said gate for moving said gate and said shutter plate to progressively uncover said apertures and regulate discharge of material therefrom, said gate movable through said control means to a point where said shutter plate is released from said first portion of said bracket means and said gate drops into said second portion of said bracket means spaced from said bottom of said hopper as said axle moves in said slots.

2. A lawn spreader as defined in claim 1, said control means comprising a control rod secured to said gate and extending along said handle means, the other end of said control rod associated with an element determining the positioning of said gate.

3. A lawn spreader as defined in claim 2, said element being disc-like and rotatable and having a plurality of indentations of varying depth at its edges, said other end of said control rod biased to rest in said indentations.

4. A lawn spreader as defined in claim 3, said other end of said control rod movable with respect to said element within a generally L-shaped track having a rounded outer configuration.

5. A lawn spreader, comprising: a hopper adapted to receive material to be spread; an axle journaled adjacent the bottom of said hopper and having wheel means for transporting said hopper; handle means fixed to said hopper for moving said hopper; apertures formed in the bottom of said hopper for discharging material; a gate including a shutter plate conforming to the bottom of said hopper and covering said apertures; members affixed to the ends of said gate, said members each having a slot therein receiving said axle adjacent its ends; at least two brackets secured adjacent said bottom of said hopper holding said gate against said bottom of said hopper; said brackets being elongated and each including a first portion extending between pairs of said apertures, said shutter plate slidable between said first portion and said bottom; each of said brackets including a second portion spaced a greater distance from said bottom; control means associated with said gate for moving said gate and said shutter plate to progressively uncover said apertures and regulate discharge of material therefrom, said gate movable through said control means to a point where said shutter plate is released from said first portions of said brackets and said gate drops into said second portions of said brackets spaced from said bottom of said hopper as said axle moves in said slots.

6. A lawn spreader, comprising: a hopper adapted to receive material to be spread; an axle journaled adjacent the bottom of said hopper and having wheel means for transporting said hopper; handle means fixed to said hopper for moving said hopper; apertures formed in the bottom of said hopper for discharging material; a gate including a shutter plate conforming to the bottom of said hopper and covering said apertures; members affixed to the ends of said gate; said members each having a closed slot therein receiving said axle adjacent its ends; at least two brackets secured adjacent said bottom of said hopper holding said gate against said bottom of said hopper; said brackets being elongated and each including a first portion extending between pairs of said apertures, said shutter plate slidable between said first portion and said bottom; each of said brackets including a second portion comprising a loop; control means associated with said gate for moving said gate and said shutter plate to progressively uncover said apertures and regulate discharge of material therefrom; said control means including a control rod of adjustable length secured to said gate and extending along said handle means, the other end of said control rod associated with an element determining the positioning of said gate, said element being disc-like and rotatable and having a plurality of indentations of varying depth at its edges, a spring enveloping said other end of said control rod and fixed to bias said other end of said control rod to rest in said indentations; and said gate movable through said control means to point where said shutter plate is released from said first portions of said brackets and said gate drops into said loops of said brackets spaced from said bottom of said hopper as said axle moves in said slots.

7. A lawn spreader as defined in claim 6, said other end of said control rod movable with respect to said element within a generally L-shaped track having a rounded outer configuration.

References Cited by the Examiner
UNITED STATES PATENTS

| | | | |
|---|---|---|---|
| 2,779,507 | 1/1957 | Rader | 222—177 |
| 3,014,622 | 12/1961 | Forsyth | 222—177 X |

LOUIS J. DEMBO, *Primary Examiner.*